(12) United States Patent
McDonnell et al.

(10) Patent No.: US 12,144,277 B2
(45) Date of Patent: Nov. 19, 2024

(54) ABOVE AND BELOW GROUND AUTONOMOUS SENSOR SYSTEM FOR CROP MANAGEMENT

(71) Applicant: ANULAND LIMITED, Shanagolden (IE)

(72) Inventors: David McDonnell, Shanagolden (IE); Declan Wrynn, Shanagolden (IE)

(73) Assignee: ANULAND LIMITED, Shanagolden (IE)

( * ) Notice: Subject to any disclaimer, the term of this patent is extended or adjusted under 35 U.S.C. 154(b) by 496 days.

(21) Appl. No.: 17/598,816

(22) PCT Filed: Mar. 19, 2020

(86) PCT No.: PCT/EP2020/057657
§ 371 (c)(1),
(2) Date: Sep. 27, 2021

(87) PCT Pub. No.: WO2020/193372
PCT Pub. Date: Oct. 1, 2020

(65) Prior Publication Data
US 2022/0183216 A1    Jun. 16, 2022

(30) Foreign Application Priority Data

Mar. 27, 2019   (GB) .................................... 1904279

(51) Int. Cl.
*A01B 79/00*       (2006.01)
*A01B 76/00*       (2006.01)
(Continued)

(52) U.S. Cl.
CPC .......... *A01B 79/005* (2013.01); *A01G 25/167* (2013.01); *G06K 7/10297* (2013.01);
(Continued)

(58) Field of Classification Search
CPC ....... A01B 79/005; A01B 76/00; A01B 79/00; A01G 25/167; A01G 7/00; G06K 7/10297;
(Continued)

(56) References Cited

U.S. PATENT DOCUMENTS

2004/0032973 A1    2/2004 Robeson
2011/0295424 A1*  12/2011 Johnson ............... G05D 1/0219
                                                         700/248
(Continued)

FOREIGN PATENT DOCUMENTS

CN    201965128    9/2011
CN    104006848    8/2014
(Continued)

OTHER PUBLICATIONS

IMETOS (iMetos CropView User Manual, Version 1.0, May 2018) (Year: 2018).*
(Continued)

*Primary Examiner* — Manish S Shah
*Assistant Examiner* — Christian T Bryant
(74) *Attorney, Agent, or Firm* — BOOTH UDALL FULLER, PLC; Kenneth C. Booth (57) ABSTRACT

The present application is directed to an autonomous system for managing crops, the system being configured to record and utilises data indicative of both above and below ground conditions at the same location to provide an output that incorporates data derived from soil conditions and land use activity. The system combines data reflective of each of above and below ground parameters as measured concurrently from in-soil sensors, imaging devices and activity trackers, and analyses the data to provide data outputs based on accurate and consistent soil and crop management measurement parameters.

17 Claims, 6 Drawing Sheets

(51) Int. Cl.
| | |
|---|---|
| A01G 7/00 | (2006.01) |
| A01G 25/16 | (2006.01) |
| G06K 7/10 | (2006.01) |
| G06K 19/07 | (2006.01) |
| G06Q 10/00 | (2023.01) |
| G06Q 10/063 | (2023.01) |
| G06Q 50/02 | (2024.01) |
| G06V 20/10 | (2022.01) |
| H02J 7/35 | (2006.01) |
| H04N 5/33 | (2023.01) |
| H04N 23/51 | (2023.01) |
| H04N 23/55 | (2023.01) |

(52) U.S. Cl.
CPC ....... *G06K 19/0723* (2013.01); *G06V 20/188* (2022.01); *H02J 7/35* (2013.01); *H04N 5/33* (2013.01); *H04N 23/51* (2023.01); *H04N 23/55* (2023.01); *A01B 76/00* (2013.01); *A01B 79/00* (2013.01); *A01G 7/00* (2013.01); *G06Q 10/00* (2013.01); *G06Q 10/063* (2013.01); *G06Q 50/02* (2013.01); *G06T 2207/30188* (2013.01); *H02J 2300/24* (2020.01); *Y02E 10/56* (2013.01)

(58) Field of Classification Search
CPC ..... G06K 19/0723; G06V 20/188; H02J 7/35; H02J 2300/24; H04N 5/33; H04N 23/51; H04N 23/55; Y02E 10/56; G06Q 10/00; G06Q 50/02; G06Q 10/063; G01N 2033/245; G06T 2207/30188
See application file for complete search history.

(56) References Cited

U.S. PATENT DOCUMENTS

2016/0223511 A1  8/2016  Koshnick
2018/0156770 A1*  6/2018  Saez ................. G01N 33/24
2019/0220964 A1*  7/2019  Mello .................. B64C 39/024

FOREIGN PATENT DOCUMENTS

| CN | 104089650 | | | 10/2014 |
|---|---|---|---|---|
| CN | 102954816 | | | 3/2015 |
| CN | 104655014 | | | 5/2015 |
| CN | 104730005 | | | 6/2015 |
| CN | 104796618 | A | * | 7/2015 |
| CN | 106500775 | | | 3/2017 |
| CN | 206573154 | | | 10/2017 |
| CN | 206847668 | | | 1/2018 |
| CN | 107920093 | | | 4/2018 |
| CN | 108318071 | | | 7/2018 |
| CN | 109142359 | | | 1/2019 |
| CN | 109282744 | | | 1/2019 |

OTHER PUBLICATIONS

Jacobs (Plant guide for common barley (*Hordeum vulgare* L.). USDA-Natural Resources Conservation Service, Nov. 2016, Jamie L. Whitten Plant Materials Center. Coffeeville, Mississippi) (Year: 2016).*

Wikipedia ("Radio-frequency identification." Wikipedia, The Free Encyclopedia. Wikipedia, The Free Encyclopedia, Mar. 22, 2019.) (Year: 2019).*

Pichorim et al. (Two Solutions of Soil Moisture Sensing with RFID for Landslide Monitoring. Sensors (Basel). Feb. 3, 2018;18(2):452. doi: 10.3390/s18020452. PMID: 29401672; PMCID: PMC5856018.) (Year: 2018).*

CropView (CropVIEW! Your Eye in the Field 3D Monitoring of Crops, Pessl Instruments Innovation EIMA 2016, 2016) (Year: 2016).*

* cited by examiner

ABOVE AND BELOW GROUND AUTONOMOUS SENSOR SYSTEM FOR CROP MANAGEMENT

CROSS-REFERENCE TO RELATED APPLICATIONS

This application is the U.S. National Stage of International Application No. PCT/EP2020/057657, filed Mar. 19, 2020, which claims the benefit of and priority to United Kingdom Patent Application No. 1904279.5, filed Mar. 27, 2019, the contents of each of which are hereby incorporated by reference in their entireties.

FIELD

The present application relates to monitoring crops, soil conditions and land user activity with a crop through use of an autonomous sensor system. The present application more particularly relates to an above and below ground automated sensor system which can operate in an autonomous fashion providing data that can be usefully employed for crop management purposes.

BACKGROUND

For environmental reasons, there is a general desire to ensure that land is managed effectively. At the same time, farming is a business and there is a need to ensure that for any additional cost the result is an increased profit.

In the context of a new piece of machinery, the cost and profits may generally be calculated. However, the same does not follow when it comes to the management of soil and crops.

In this context, a crop may be a harvestable crop, such as for example wheat or barley, or it may for example be grass grown for grazing or other purpose.

Farm management is an increasingly complex management task. Farm sizes are increasing, and this is leading to increased levels of work, both in terms of physical labour and decision making. Decisions are made based on the farmers ability to process the available information, usually in periods of intense activity, as external conditions force reactive management. There are a number of factors in crop production that generate data that is used in decision making. Examples of such factors are soil conditions, weather conditions, crop type, agricultural practices, and predicted yields. The farmer is trying to manage these factors to achieve a predicted yield in order to maintain an economically viable business.

More particularly, a lot of decisions regarding management of land on an individual farm are not supported by evidence but instead rely upon advice provided by others, typically this advice is based on trials conducted on entirely different land with different soil conditions.

As a simple example, research conducted might result in general advice that for certain crops, there is a preferred pH value or other soil condition.

At the same time, there are a wide variety of tools available to allow a farmer to test the soil where they intend to or are growing a crop.

Typically, such tools allow a farmer, to take a sample and analyse the sample for a test result. As explained above, a common test would be to determine the pH level of the soil sample. Such a test might be performed on an annual basis. Based on the results of the test, a farmer may, based on the advice seek to add lime, fertiliser or other additive to the soil to adjust the pH balance.

Whilst such an approach is obviously useful, the difficulty is that any guidance is at best general and doesn't allow for any real optimisation for specific land conditions.

At the same time, the farmer has no real guidance as to when it may be best to perform certain actions on the land, e.g. adding fertilizer, cutting a crop, spreading slurry, watering etc. Instead, conventional advice is based on doing certain actions at certain times of the year.

There are a number of systems which employ cameras to measure crop growth and have sensors for measuring ambient conditions. For example, CN109282744 describes a crop monitoring device that uses image sensors for acquiring crop images. Data from the image sensors is uploaded through a communication unit for subsequent processing.

There is however no autonomous system available that allows a farmer to effectively collect data indicative of both above and below ground conditions for the same location in an efficient manner so as to allow guidance to be generated to advise the farmer on their agricultural practices.

SUMMARY

The present application seeks to address the problems in the art by providing devices and systems that allow a user to accurately collect and aggregate data about the soil on their lands and the crops that they are growing. Having accurate data indicative of a plurality of aggregated parameters collated in an automated fashion allows a user to be more informed about their crop and land management practises. Per the present teaching data indicative of below ground conditions is gathered by in-soil sensors. That data is correlated with contemporaneously acquired image data indicative of above ground growth of a particular crop to provide an overall combined data set that can be processed to trigger advanced warning and other indicators to a farmer or other user to assist in crop growth optimisation.

The present application addresses known problems by combining a number of different elements together in a system, although each may be provided separately of the others. These elements and systems are described below.

A first embodiment provides a sensor system for monitoring ground in an area in which a crop is grown. The sensor system comprises a hub, at least one soil sensor for measuring a parameter of the underground soil in the area and providing the measurement to the hub and a first imaging device comprising a first lens and a first image sensor in communication with the hub. The first image sensor having a defined field of view is suitably aligned transverse to an imaging axis and configured to capture an image of the area within the field of view and to provide the captured image to the hub. By contemporaneously measuring in-ground soil parameters through use of one or more soil sensors that are located below the ground within the field of view of the image sensor and are therefore directly tied to the area for which images are captured it is possible to corelate crop conditions with measured ground parameters.

The system may further comprise a support for positioning the first imaging device a vertical distance above the ground. The hub may be housed within the support.

The support may be a structure configured for mounting in the ground having an above ground portion and a below ground portion which are intended to respectively be positioned above and below ground level. Suitably, the structure has a port provided in the below ground portion to facilitate an underground connection between the at least one soil sensor and the hub. The structure may support the first imaging device. The first imaging device may be positioned at a height of between 0.5 m and 1.5 m above ground level. Preferably, the first imaging device is positioned at a height of between 0.9 m and 1.2 m above ground level.

An alternative manner of stating the height of the first imaging device is to have it positioned at a height corresponding to between 0.2 m and 1 m above the expected maximum crop height. This will vary from crop to crop. It will be appreciated that these referenced heights are related to the anticipated canopy height of the crop being measured and as such functionally what is required is that the height of the imaging device is preferably greater than the anticipated maximum height of the crop being grown.

The imaging axis is suitably at an angle of between 50 and 80 degrees to the vertical. Preferably, the imaging axis is at an angle of between 60 and 70 degrees to the vertical. Again, it will be appreciated that these angles are indicative of a preferred set of angles to define a field of view of the imaging device sufficient to allow a capture of image data from an extended area of the crop being monitored. In the even that the imaging device is provided at a higher height, the angular offset form the vertical can be reduced without loss of actual coverage within the field of view.

In some arrangements, the first imaging device is housed within the support. A viewing port may be defined in an outside wall of the support and the imaging axis is transverse to the plane of the viewing port. The lens may be recessed from the viewing port, in which case the lens may be recessed from the viewing port by a distance of at least 1 cm. The lens may also be flush with or protrude from the viewing port.

The first imaging device may be housed within a heat insulating material within the support.

The hub may be provided within a protective enclosure within the structure.

The sensor system suitably has a power source for storing power for powering the hub, image sensor and at least one soil sensor, which may be housed with the support. The power source may be a rechargeable power source and the system may further comprise a solar panel for recharging the rechargeable power source. To adjust for orientation to the sun, the solar panel may be rotatably mounted to the structure.

The lens may have a focal length which defines a field of view for the image sensor, which restricts an image of a crop area of between 1 m×1 m to 10 m×10 m, suitably between 1.5 m×1.5 m to 5 m×5 m, to be captured.

The first image sensor may be a visible light image sensor, an IR light sensor or a far IR sensor.

Suitably, the first image sensor has a resolution of at least 1 mega pixel. The first image sensor may have a resolution less than 10 mega pixels.

The sensor system may comprise means provided on the structure for indicating the position of the sensor. The system may further comprise a radio transmitting device in communication with the hub for transmitting data from the hub, the data comprising images acquired from the first imaging device and measurements obtained from the at least one sensor. This radio transmitting device may be configured to establish a data connection with a mobile telephone network or other radio telecommunications network.

The hub may be configured to operate in a sleep mode and to awake periodically at a first interval to obtain a measurement from the at least one sensor. The first interval may be at least 5 minutes.

The hub may be configured to power the first imaging device periodically at a second interval to obtain an image from the image sensor, wherein the first interval is at least 5 times shorter than the second interval. The second interval may be at least an hour.

The hub may be configured to place the radio transmitting device into a low power state when not transmitting data.

The system may further comprise a second imaging device comprising a second lens and a second image sensor in communication with the hub, the second image sensor being aligned transverse to a second imaging axis.

Suitably, the second imaging device is positioned a distance, suitably along the longitudinal axis, from the first imaging device. The second imaging device may be directed to capture substantially the same crop area as the first imaging device.

The second imaging device may be configured to be a height of at least 0.5 m above expected maximum crop height. In context, the maximum crop height may be at least 1.2 m. The second imaging device may be at height of at least 0.5 m above the first imaging device.

The at least one soil sensor may comprise one or more of: a pH sensor, optionally a resistance pH sensor; a soil temperature sensor; a soil conductivity sensor; a soil moisture tension sensor.

The sensor system may comprise a locating device for locating the position of the at least one soil sensor.

The locating device may comprise a laser device aligned on the support so that the beam from the laser device points to the position of the at least one soil sensor. The at least one soil sensor may comprise a RFID and in which case the locating device may be a RFID detector.

One or more of the soil sensors may be wirelessly coupled to the hub. Similarly, individual ground sensors may be coupled by wire to the hub.

The sensor system may be configured to determine a measurement of crop from a first image obtained from the imaging device and to determine a measurement of crop for a second image obtained from the imaging device and to compare the first and second measurements to determine a growth figure for a crop within the image.

The sensor system may further comprise a server having a data connection with the hub for the transmission of the first and second images to the server and wherein the server is configured to determine the growth figure.

A second embodiment provides a method of use of a sensor system as described in the first embodiment comprising the steps of:

positioning the hub and the first imaging device adjacent to but outside the crop area to be monitored and aligning the imaging device so that it can capture an image of the crop area and burying the at least one ground sensor within the crop area and connecting the at least one sensor to the hub.

A third embodiment provides a tracking system for tracking user activity on farmland. The system comprises a user device for tracking the position of the user; a farm map store, the farm map store mapping a farm associated with the farmer and at least partially segmenting the farm into at least one area of crop usage; an activity engine responsive to the tracked positions from the user device and for identifying tracked positions within the one of the at least one areas of crop usage and being configured to associate an activity with the one or more distinct areas.

This tracking system may be combined with the first embodiment, wherein the sensor system is associated with a distinct area and the hub is configured to communicate with the system to provide the system with measurements obtained for that area.

The tracking system may further comprise one or more identification transponders, each tracking transponder being associated with a piece of equipment on a farm, wherein the farmer device is configured to identify the presence of an identification transponder and to associate tracked positions with the identified equipment or an activity associated with the identified equipment.

The tracking system may further comprise a graphical user interface allowing a farmer to view activity on their farm.

The imaging devices employed may have an inclinometer and a display, the imaging device being configured to display an indication to the user when the imaging axis of the imaging device is at a desired angle with respect to vertical to allow the user to capture an image of a crop at the desired angle, wherein the desired angle is suitably between 50 and 80 degrees, more suitably the imaging axis is at an angle of between 60 and 70 degrees to the vertical.

The imaging device may be configured to geo-tag any image of crop captured. The imaging device may be configured to upload the image of crop captured to a server and to receive an indication of crop yield or crop growth or both for the captured image from the server and to display this indication to the user.

A fourth embodiment comprises a computer system comprising a server having a network connection to a network, the server being configured to:
 a) receive a first image of a crop from a device through the network connection;
 b) receive a second image of the crop from the device through the network connection, wherein the first and second images are taken an interval apart;
 the computer system further comprising a neural network, the neural network being configured to accept the first and second images and to provide a growth figure for growth of the crop during the interval.

The neural network is suitably trained using a plurality of images associated with known values of crop volume.

A fifth embodiment provides a computer system comprising a server having a network connection to a network, the server being configured to: receive a first image of a crop from a device in respect of a first crop location through the network connection; wherein the computer system comprises a neural network, wherein the neural network has been trained using a plurality of images associated with known values of crop volume and wherein the system is further configured to process the first image through the neural network to determine a first crop volume in respect of the first image to provide a crop volume for the first image.

The server may be further configured to receive a second image of the crop in respect of the first crop location, wherein the first and second images were obtained an interval apart, optionally wherein the interval is at least one day. In which case, the system may be configured to:
 process the second image through the neural network to determine a second crop volume in respect of the second image to provide a second crop volume for the second image;
 wherein the system is further configured to determine a crop growth value representing the increase in crop volume between the first and second crop volumes for the interval.

In the claimed arrangement, a particular configuration is set forth which advantageously allows for the crop area being monitored by a camera to correspond to the area being sensed with the support being removed from the crop area so that it does not interfere with animals grazing or machinery operating on the crop. In the present application, crop area refers to an area of being monitored. It need not necessarily have a crop planted in it but may for example represent an area which has been left to go wild or is a bog or similar situations.

These and other features, advantages and solutions will be better understood from the description which follows.

BRIEF DESCRIPTION OF THE DRAWINGS

The present application will now be described with reference to the accompanying drawings in which.

DETAILED DESCRIPTION OF THE DRAWINGS

The present application provides a system that allows a farmer to observe their agricultural practices, patterns and results to enable them to make more accurate and informed decision on crop and soil management to improve crop yields or crop conditions. In this context, the system can adapt for different practices, rules, crops and conditions from farm to farm, locality to locality and country to country.

The present application also allows for more informed reporting in the context of more effective automated collection of data from the farm. This accommodates changes to farm management being imposed by National/State/Federal/European Directives/law to ensure compliance by the farmer.

In the context of this application, a farmer may be taken to include any land user growing a crop. The crop in turn may not necessarily be for harvesting. As a simple example, the present application would be suitable for groundskeepers to monitor the condition of grass on golf courses, racecourses, football pitches etc and so the terms farmers and farming as used herein may be considered broadly to involve any land user growing a crop for whatever purpose.

The system comprises a number of separate elements which co-operate together to provide information to the farmer that enables the farmer to proactively make decisions to control how his farm and/or crop reacts.

Each of the separate elements comprises novel and inventive aspects and so the application is not to be construed as merely covering the system as a whole but rather is to be considered as covering each of the separate elements on their own and in any combination concurrently.

Figure 1:
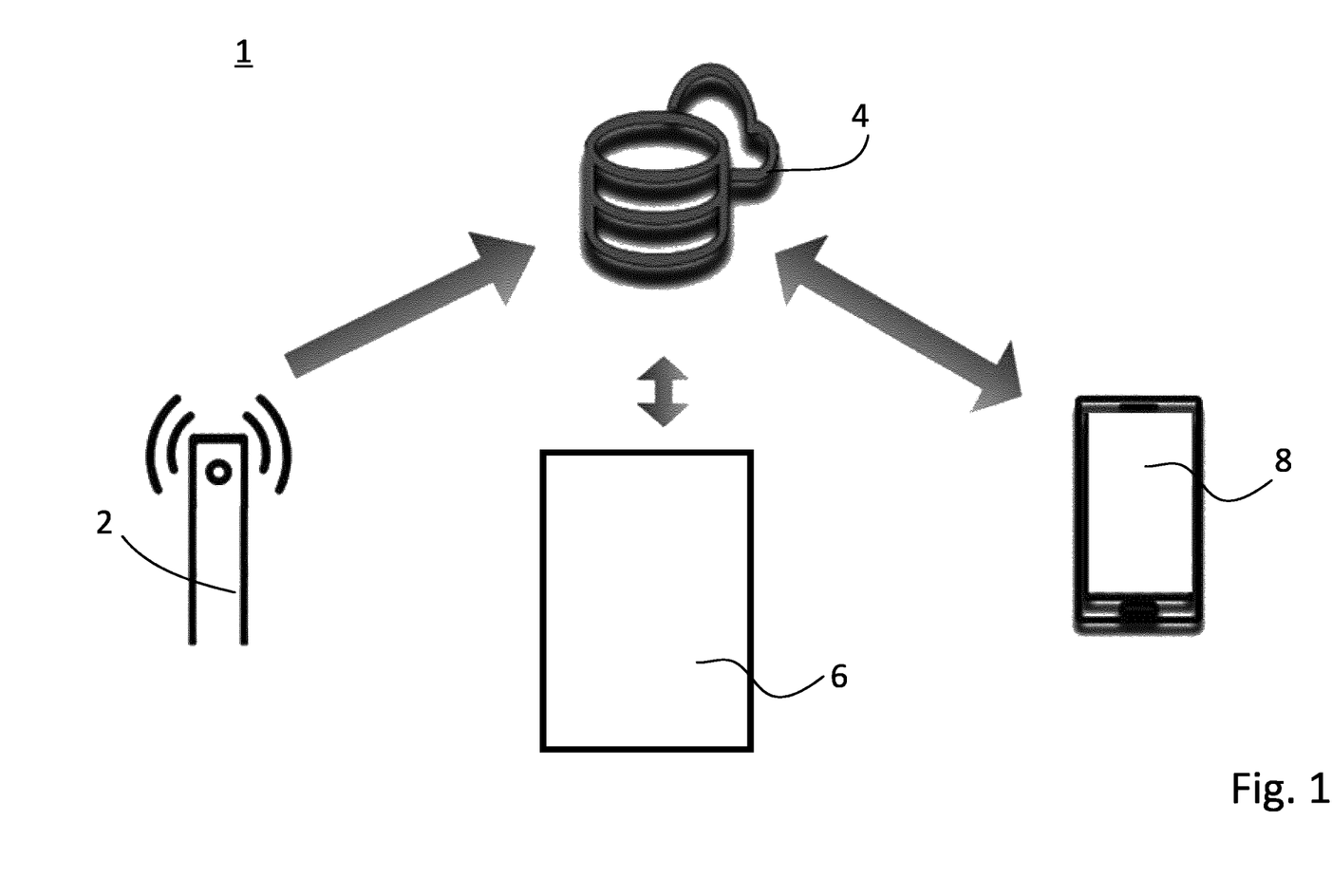
FIG. 1 is a representation of different elements of a system according to a first aspect of this application.

These various aspects will now be described in the context of an overall system as shown in FIG. 1. The overall system 1 comprises a combination of a user interface provided on a mobile phone 8 or similar computing device, in-field sensors 2 allowing measurements to be obtained from the land and a server arrangement 6. The various elements are interconnected by a network, suitably the internet. The server 6 may be a cloud server. In this context, it will be appreciated that the reference to server may be a reference to several different servers, each performing a different function. Thus, a first server may be provided for managing a database for storing data received from the in-field sensors and user interface. A second server may be provided for interacting with and receiving data from the in-field sensors. Similarly, a third server may provide for interaction and access by the user interface. In this particular context, the server may provide an application programming interface (API) allowing the user interface on the mobile device to interact with the server. A further server may be provided allowing analysis of data submitted from the in-field sensors and user mobile devices and other data sources.

As a whole, the server is configured to allow the storage of data collected from the in-field sensors and the user interface in one or more databases.

At the same time, the server is suitably configured to allow analysis to be performed on the data collected from the in-field sensors and from which guidance may be generated by the server and provided to a user through the user interface.

The various elements of the system co-operate to provide decision support to land users such as farmers to improve crop yield and quality. The system comprises unique automated data collection systems for obtaining in-field data, agricultural practices data and farmer behaviour data, a cloud-based storage system and a rules-based system of unique interrelationships that process the data to produce decision support data.

The system measures and records aspects of crop production relevant to improving yield or quality or both and outputs decision support data that aids changes in farmer behaviour. These changes may be subtle or significant but would generally be directed to optimise management practices.

These changes to management practices (agricultural practice and farmer behaviour) result in improved crop yield, improved crop quality or both whilst at the same time considering the cost of the improvement.

Thus, whilst generally the intention with a crop is to maximise yield, in certain circumstances quality is more important. As an example, the crop may be a grass on a golf course, tennis court or a horse racing track where the condition of the grass and underlying soil is of greater importance than the quantum of grass yielded in a season.

The system bases its decisions on using sensor systems for monitoring ground in areas in which a crop is grown. In this way, a system per the present can be configured to output decisions based on using sensor systems for concurrent monitoring above and below the ground in areas in which a crop is grown. The sensor system is referenced herein as a Soil Monitoring Unit. SMU. The SMU, which will be described in greater detail below, is employed to collect specific field data. The SMU comprises a hub which performs local processing on data captured by the sensor system is also configured to to communicate captured data, as will be explained below, to the server. The SMU further comprises at least one ground sensor for measuring a parameter of ground in the crop area about the sensor system. The at least one measured parameter are provided to the hub.

The soil monitoring unit additionally comprises one or more imaging devices for capturing an image of the crop area. It is preferable that the crop area captured by the one or more imaging devices correspond to, or are aligned exactly with, an area in which the ground sensors are buried. However, this is not absolutely essential as long as the imaging device is directed to capture an image of the same crop generally to that being measured by the in-ground sensors. Thus, the area being monitored could be considered to be a field in which a crop is grown or a smaller area within such a field.

Behavioural data and agricultural practices data can be gathered through a system for tracking user activity on the user's device 8. In this context, user activity may be that of an individual, e.g. a farmer or farmhand, or of a machine, e.g. a tractor, or combine harvester. As will be described below, in certain instances, the system for tracking user activity may be at least partially implemented as an application on a mobile phone or similar communications device including a positioning system and a means for data communication.

In addition to collecting information from the soil monitoring unit and the device for tracking user activity, the system may also retrieve other information of relevance to the area being monitored, an example of such data is weather data or data from other farm technology and management systems.

The resulting collection of data in combination with knowledge-based rules which may be implemented in the form of inference engines, allows for decision supports to be provided to a farmer so that the farmer gets maximum use from his resources to produce an optimal yield or quality or a combination of the both from his crop.

The system as a whole makes use of a combination of behavioural data agricultural practices, agronomic expertise and field data to develop unique interrelationships between the data. These unique interrelationships allow farmers to improve their specific agricultural practices resulting in increased crop yield, increased crop quality or both.

The system will now be described in greater detail with reference to the individual elements, beginning with the soil monitoring unit The soil monitoring unit comprises a hub, one or more ground sensors and one or more imaging devices. The imaging device is a suitable camera with a suitable lens. The plane of the camera sensor, for example a CCD (charge coupled device) array is suitably aligned through the camera lens to capture the area of ground of interest which is directed to and focused on an area of ground being monitored. The soil monitoring unit may also be connected wirelessly with other sensors and cameras.

Suitably, the ground sensors are buried in this area of ground to ensure that the images captured correlate directly to the ground in which the parameters relating to soil conditions are being measured concurrently by the ground sensors. In this way a data set comprising both image data from above ground and soil condition data from below ground is concurrently generated. It will be appreciated that ground conditions in a field can be considered to be reasonably uniform and as such if the imaging device is directed at a different area of crop in the field, the measurements from the images will correlate with measurements obtained from the in-soil sensors.

It will be appreciated that the area being monitored can be selected to be reasonably large so that image analysis may be performed on a reasonable representation of the crop. At the same time, the area of ground monitored is selected to be small enough that the measurements obtained, both from above and below ground level, may be used to calculate desired parameters including plant growth. In this context, it will be appreciated that the area selected will depend on a number of different factors including the resolution of the camera, the height and positioning of the camera, and other factors.

Within these general constraints, the present inventors have identified that having a sample area which corresponds to a crop area can be generally determined to be within the range of between 1 m×1 m and 10 m×10 m. A crop area between 1.5 m×1.5 m to 5 m×5 m represents a reasonable range. It will be appreciated that whilst these areas are expressed in the form of a square, that the actual area measured may be reflective on the shape of the image sensor employed. At the same time, it will be appreciated that the focal length of the lens of the camera is suitably selected to ensure that the images captured for an area of interest are suitably within focus.

The image sensor is suitably positioned a distance above the ground that is sufficient to ensure that it will be above a canopy height of the crop being monitored. The person of ordinary skill will appreciate that this height may vary dependent on the crop being monitored. For example, when monitoring grass, a height of above 1-2 metres may be sufficient. When monitoring corn or maize, heights in excess of 2-4 metres ma be necessary. As each crop has an anticipated maximum canopy height—the height at which it will grow to before being harvested—the height at which the image sensor needs to be positioned can be readily ascertained prior to installing the unit for monitoring the growth. A suitable support may be employed for this purpose.

The image sensor is also preferably positioned horizontally so that it is located adjacent to the area of ground being monitored but does not actually have to be within or above the area of ground being monitored. The rationale for the image sensor not being positioned directly above the area of ground being monitored is two-fold. Firstly, it allows for farm machinery to operate on the ground being monitored without interference from the camera, it doesn't have to physically avoid the camera. By having the image sensor whose field of view is directed onto the area of land being monitored, the crop is being monitored by a sensor that is physically co-located with the crop, albeit adjacent as opposed having being within the extant of the growing crop. Secondly, it allows for the imaging device to be aligned at an angle to an area of interest, which allows for measurements, for example of crop growth, to be more easily ascertained.

The image sensor is primarily provided to measure parameters associated with the crops themselves, for example crop growth. However, the image sensor may also be used to monitor animals, for example to measure the presence, identification, or activity, of insects present on or about the crop.

Where the system is employed on a farm, the image sensor components of the camera are housed within an elongated support which may in turn be a post or pillar (as described below). However, in other applications the image sensor may be housed elsewhere. As an example, in the case of a horse racing course, the support may be a crash barrier adjacent to the track. In this arrangement, the camera may be housed within the barrier to hide it from general view and to protect it. Equally, it may be provided within a housing mounted to the barrier. Similarly, in the case of a golf course, the imaging device may be supported by course furniture or a feature such as a tree. In the case of a tennis court, the camera may be housed within or mounted to the net pillar or an umpire's chair.

In certain situations, the camera or additional cameras may be employed to provide spot measurements at other places in the field being monitored or other fields. This may serve to re-assure farmers that a single fixed measuring device sensing the ground conditions accurately reflects growth throughout a field. In this case, the camera may not be fixed in place but may be employed to take an image as required. In this scenario, the camera may be provided on a support having a pre-determined height which is positioned as required. However, as will be discussed below, having an accurate height may not be required and a rough height may suffice. At the same time, the camera is angled at a predetermined angle to capture an area of interest. In this case, the camera may be provided by a mobile phone or similar device having an in-built camera. The advantage of using a mobile phone is that they generally have a global positioning system functionality built in (typically GPS) along with compass and inclinometer functions built in and so may be configured through an application to reliably capture an image of an area of ground in a reliable and repeatable manner. This approach may be desirable, for example, in the case where the system is monitoring a putting green on a golf course and having a support permanently in place would be undesirable for aesthetic reasons. In such a scenario, the hole on the putting green might be used as the position for positioning the camera with the user using the app to confirm a desired direction and angle of inclination. The support may have a platform provided which is shaped to receive a mobile phone. An adjustable grip may be provided to secure a mobile phone to the platform. The platform may be mounted to the support but configured to be free to rotate around the vertical axis of the support so as to allow the mobile phone to capture images of a wide angle of the crop surrounding the support, e.g. between 180 and 360 degrees. 180 degrees is suitably when the support is positioned at the edge of a field with 360 degrees suitable with it is positioned within a field surrounded by crops. The application on the mobile phone capturing the images may be configured to take a series of images as the mobile phone is rotated. The images captured may be used in subsequent analysis and more particularly may be employed to provide a measure of crop height or growth or both. Where the camera is not a fixed one, the images may be geo-tagged with GPS co-ordinates to ensure that the images are associated with the correct area of land.

Images may also be captured using the app on the phone without the use of a support. In this case, the farmer may hold their phone at approximately the right height. At the same time, the app may indicate when the phone is inclined at the correct angle. Once at the correct angle, the app may capture an image of crop automatically. Alternatively, the app may allow a user to capture an image using conventional functionality on a phone, e.g. a physical button the phone or by touching a control presented on the screen of the phone.

Similarly, a mount may be provided on a farm vehicle, e.g. a tractor or quad for receiving a mobile phone or other imaging device to capture a plurality of images as the farm vehicle moves through an area of land.

Turning to consider the more general application where the support is a structure which is configured to be fixed in the ground. The structure may be a pillar or post like structure. The pillar is positioned to be outside the area being farmed of interest and thus may be positioned adjacent to but outside the boundary fence. The pillar is suitably robust to ensure it is resistant to animals or other interference. In this context, it is desirable that the pillar have the form of a strong resilient structure as farmers might be reluctant to invest in any product which may appear flimsy. Equally, being robust reduces the likelihood of animals damaging the post.

Figure 2:
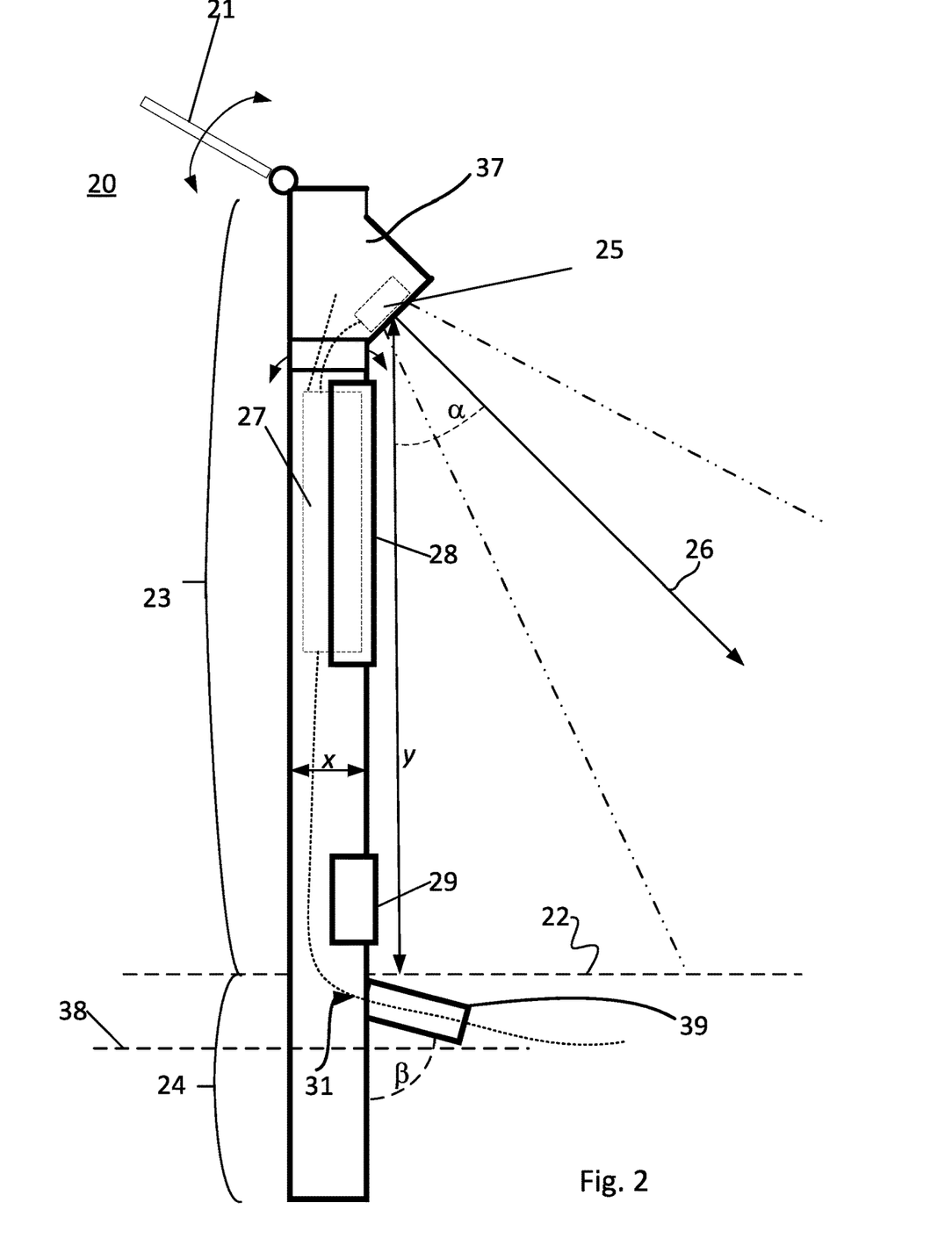
FIG. 2 is an exemplary structure which acts as a support for a hub and imaging device which may be employed in the system of FIG. 1.

Thus, as shown in FIG. 2, the structure may be fabricated from box or tubular material having a cross-sectional diameter, x, in the range of 5 cm to 15 cm. Suitably, the cross-sectional diameter of the structure is about 10 cm. At the same time, a wall thickness for the pillar of between 2 mm and 8 mm ensures a sufficient strength although this may vary based on the pillar material selected. In this context, the structure material is suitably selected to be of a sufficiently strong material, for example plastic, fibre-glass, carbon fibre or metal. In the case of metal, it is desirable that the metal be selected to be corrosion resistant. In this context, the metal may be steel. The metal may be treated, e.g. in the case of steel galvanised, coated with a protective coating such as suitable paint or both.

The structure of FIG. 2 is configured to be fixed into the ground. To ensure that a repeatable result is obtained, the structure may be configured with a marker or a feature, for example a flange (not shown) which indicates ground level 22 or more correctly the amount of the structure intended to be buried below ground, the below ground portion 24 and the amount of the structure to be left above ground level, the above ground portion 23. In this way, the pillar may be fixed into the ground and the height of different features on the pillar above ground pre-determined. The structure may be fixed into ground using concrete.

By having the ground level fixed relative to the structure, the structure functions to position a camera 25 a pre-determined vertical distance y above the ground. In this context, it will be appreciated that the height of the camera above the ground will depend on the crop being measured. The camera height y may be taken to be measured from a centre point of the lens of the camera.

The camera may be housed within a head unit 37 mounted to the top of the structure. The head unit suitably has a viewing port formed therein to provide an opening for the lens or the camera. The viewing port is suitably in the outside wall of the head unit. Suitably imaging axis of the camera is aligned along an imaging axis which is generally transverse to the plane of the viewing port. The head unit may be removable from the main structure. As an example the head unit may be shaped to slide onto the main structure. The head unit may be rotatably mounted to the structure to allow the head unit to rotate around the vertical axis of the main structure allowing for the camera to be aligned to a crop area of interest.

Figure 3:
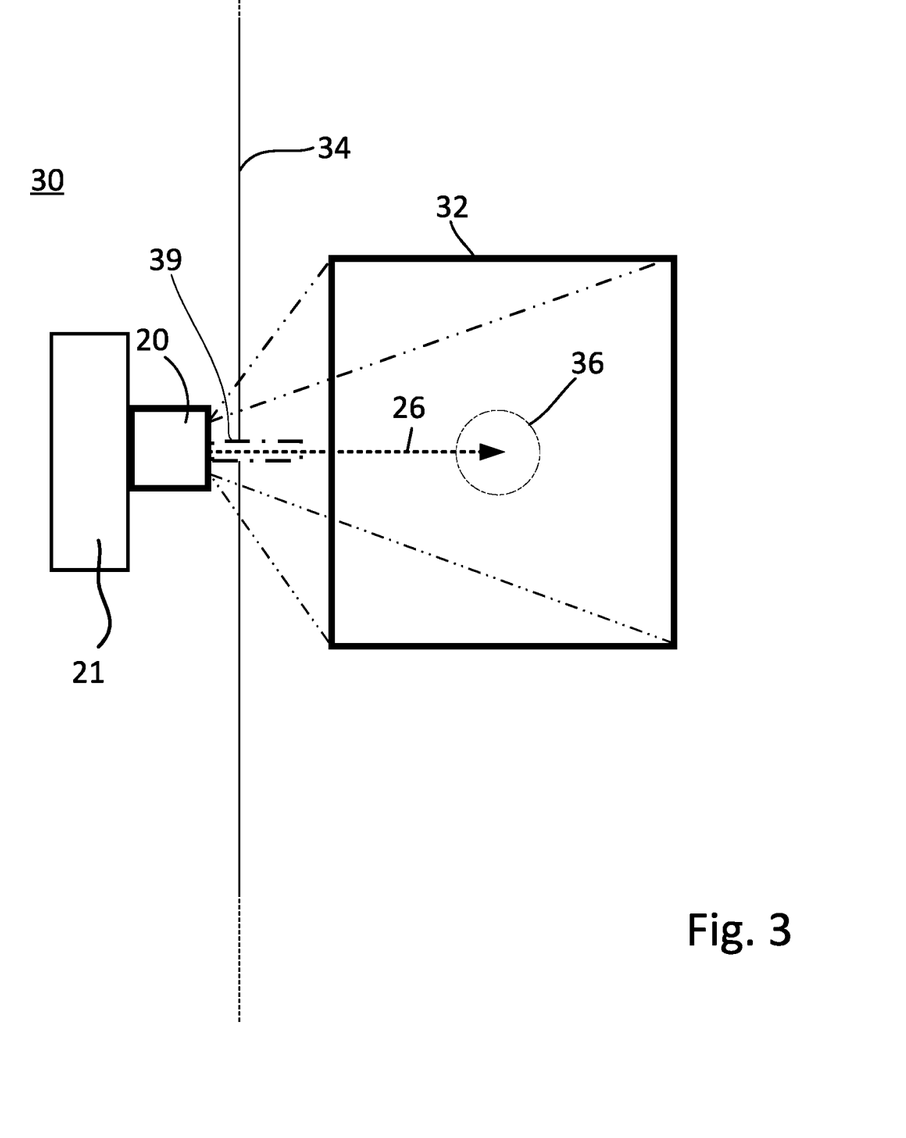
FIG. 3 is a plan view of exemplary support of FIG. 2 positioned to monitor a crop.

The imaging axis 26 of the camera is angled with respect to the vertical axis of the structure (or vertical generally) by an angle $\alpha$ so that the camera is directed generally to the area of ground to be observed. More specifically, as shown in a typical view from above of a structure 20 in situ positioned outside the boundary fence 34 of a field to be monitored, the imaging axis 26 is directed to the centre of an area of ground 32 to be monitored. At the same time, the field of view of the camera is selected to cover the area of ground of interest 32. At the same time, the in-soil sensors may be buried in an area 36 defined about the point where the imaging axis intersects with the ground, which corresponds with the centre of the area of ground of interest. This ensures that the in-soil measurements are representative of the area of land of interest, such that the system provides both above and below ground measurements of the same region. In this context, it is desirable that this is a distance from the boundary fence to ensure it is representative of the crop being monitored as it will be appreciated that land immediately adjacent or under a border fence may not be accessible to machinery and so may not be representative of the conditions of the general crop area of the field.

Figure 5:
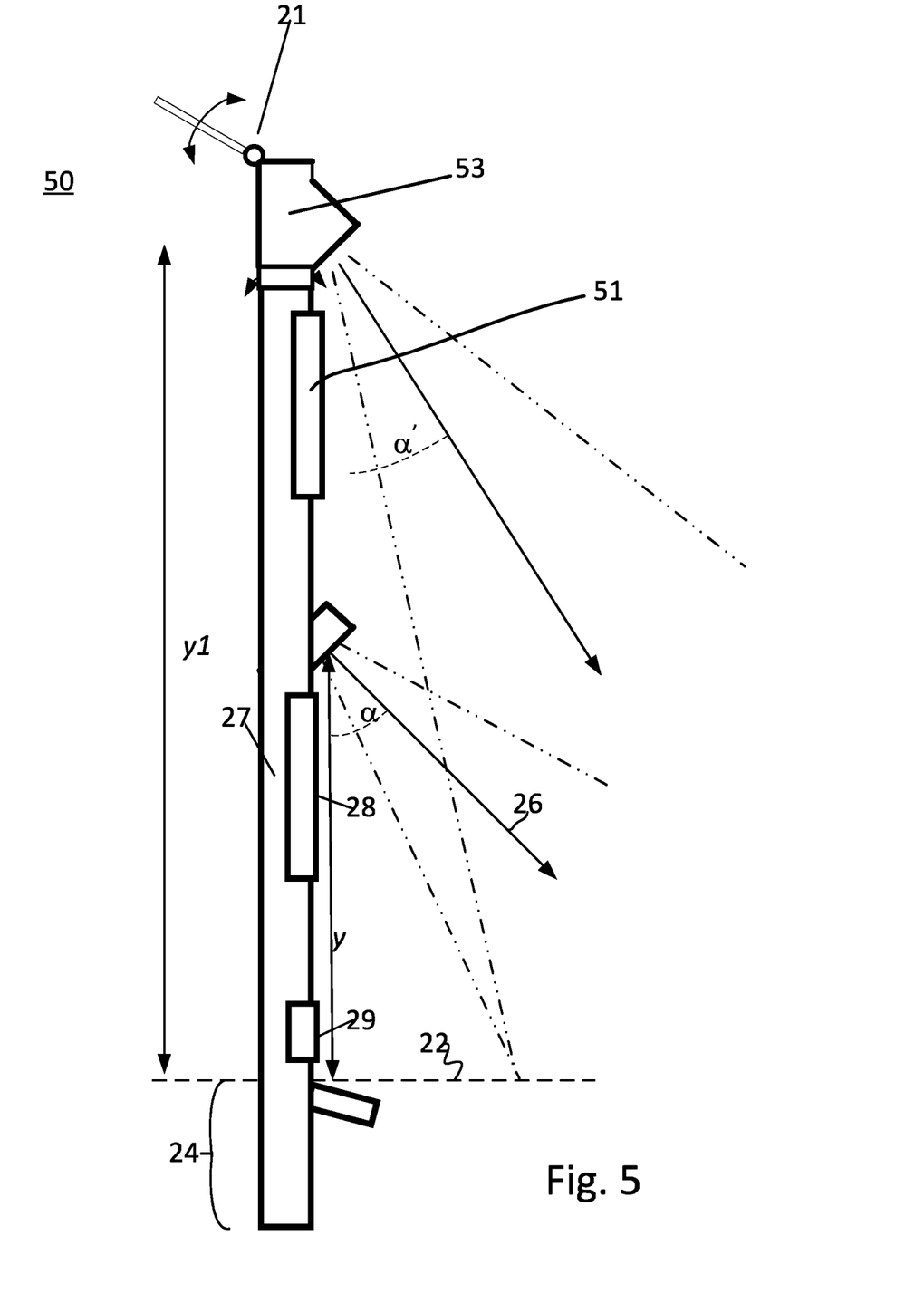
FIG. 5 is a further exemplary structure which acts as a support for a hub and imaging device which may be employed in the system of FIG. 1.

For general tillage crops, it is desirable that the camera be positioned at a height of between 0.5 m and 1.5 m above ground level. More desirably the camera is positioned at a height of between 0.9 m and 1.2 m above ground level. It will be appreciated that with certain crops which have a significant growth height that the camera may need to be positioned higher. At the same time, if the camera is positioned higher, the ability to measure crop growth at early stages may be less accurate. To account for this, for tall crops, there may be two cameras provided as shown in FIG. 5. The first camera may be positioned at a lower height y for measuring early stage growth and the second positioned at a higher height y1 relative to the first for measuring later stage growth. In this context, the second camera may suitably be positioned at a height above the maximum crop height expected.

In the case of a structure with two cameras, the first camera may be mounted as described above and an extension may be provided to extend the structure up to a further head unit 53. In this case, a further door 51 may be provided to allow feeding of connections from a camera in the head unit.

If there is only a single camera, equally the camera may suitably be positioned at a height above the maximum crop height expected. The height above the maximum crop height expected is suitably 0.5 m. In this context, it will be appreciated that maximum crop height may be taken as an average height at which a crop is expected to be harvested.

The camera may be any suitable camera. In this context, depending on the area being measured, it is desirable that the camera be selected such that the relative ratio between the camera sensor and the area being monitored be at least 2 Megapixels per square metre being monitored.

Depending on the crop or application, the camera may be selected to be a visual light camera or an infra-red camera. In certain applications, both may be provided. Using different types of camera allows for different parameters to be measured. As an example, the use of an infra-red camera allows for a measurement in respect of the moisture content of the crop to be obtained.

Where there are two cameras positioned at different heights, the cameras may be selected so that they share a view of the same crop area. Thus the imaging axis angles ($\alpha$, $\alpha'$) of the first and second camera may be different. Equally, the fields of view of the first and second cameras may be different.

The below ground portion 24 may have a port 31 provided in the outside wall of the pillar. The port is selected to be positioned above any concrete so as to allow a path for cables into the pillar. More particularly, the port is provided to provide a path for cables from one or more ground sensors into the pillar. Accordingly, the port is suitably angled at an angle $\beta$ and extends generally in the same direction from the pillar as that of the camera since this is where any ground sensors are generally intended to be placed but not necessarily so. The pillar may be angled at the top relative to the vertical so that a camera housed within the pillar is effectively set at a pre-determined angle to the ground. At the same time, a port may be provided above ground level (not shown) to allow the connection of one or more external above ground sensors, for example temperature or humidity sensors or to allow air into the pillar where such sensors might be positioned.

The elongated support or pillar may also serve to house the hub 27. The hub may be connected by wire or wirelessly with the ground (soil) sensors and obtains measurements from them. The hub 27 suitably also communicates with and controls the operation of the camera. In the context, where the camera is provided in a removable head unit a connector may be provided to allow the camera to make a removable connection to the hub.

A first door 28 may be provided on the support to allow access to the hub. Accordingly, the door may be sized to allow the hub to be removed and replaced as required. In this context, the hub may be housed in a protective enclosure. The protective enclosure may be a hermetically sealed container to keep moisture away from the electronics of the hub. Electrical connectors may be provided externally on the container to allow the connection of the camera 25, in-soil sensors (not shown) and other components including for example a solar panel 21. The solar panel may be fixed to a surface on the main structure or head unit. As shown, the mounting of the solar panel may allow the angle of the solar panel to be adjusted so as to ensure that the panel is optimally directed to capture sunlight. The hub suitably houses a power source, which may be in form of one or more rechargeable batteries. These rechargeable batteries may be recharged by the solar panel.

In the exemplary pillar shown in FIG. 2, the below ground port in the pillar positioned below (intended) ground level extends into a conduit. The port is suitably positioned to be at or just below ground level. In this context, at or just below ground level may be taken to mean that the top of the port is less than 20 cm and preferably less than 10 cm from intended ground level. The conduit 39 may be a rigid conduit of the same material of the pillar. In this context, it may be formed as an integral part of the pillar. The exit of the conduit is selected to be above the level of concrete 38 in which the pillar may be embedded. To facilitate ease of feeding cables providing the electrical connections, the conduit may extend at an angle $\beta$, for example between 10 and 45 degrees, downwards from the pillar. An advantage of arranging the conduit with such an angle is that that any cables fed from the in-soil sensors through the conduit will be directed upwards into the pillar making it easier for a person making a connection between the hub and in-soil sensors during installation or maintenance. In this context, a second door 29 may be positioned a short distance above ground level to allow a person installing the pillar or performing maintenance to access cables fed through the conduit from the in-soil sensor and to feed them upwards towards the hub.

To measure growth and other factors, the camera is suitably selected to have an imaging axis which is at an angle $\alpha$ of between 50 and 80 degrees to the vertical. More desirably, the imaging axis is at an angle of between 60 and 70 degrees to the vertical.

By housing the camera or cameras within the support they are protected from the elements and animals. In this context, a viewing port may be defined in an outside wall of the pillar. In this arrangement, the imaging axis is selected to be transverse to the plane of the outside wall with the viewing port.

For greater protection, the lens of the camera may be recessed within the pillar a distance from the viewing port. This distance may for example be at least 1 cm. However, the lens may be covered by a transparent cover. Using a transparent cover, the lens may be flush with or protrude from the viewing port. The advantage of this is that a wider-angle image may be captured as the view is not obscured by the port.

As the atmospheric conditions may be expected to vary considerably, the camera may be housed within a heat insulating material within the pillar so that it is protected from extremes of high and low temperatures and temperature fluctuations generally.

To provide power to the soil sensors, hub and camera, a power source may be provided. It will be appreciated that an external source of electrical power may not readily be available beside a field on a farm and accordingly it is desirable that the power source be a battery or similar energy storage device. The battery may be a rechargeable battery which is recharged by a solar panel which may be a solar cell or array. The solar panel in turn may be provided on the pillar. In this respect, the solar panel may form the top surface of the pillar. The battery is preferably housed within the pillar to protect it. Suitably the battery capacity is selected to be at least 12 times z, where the maximum power demands of the hub, sensors, and camera per day are z. In this context, in an exemplary arrangement a power demand of 0.8 Ah per day has been determined. This ensures that there is sufficient reserve to account for bad weather where the performance of the solar panel is reduced or to account for reductions arising from cold temperatures affecting the capacity of the battery.

Figure 4:
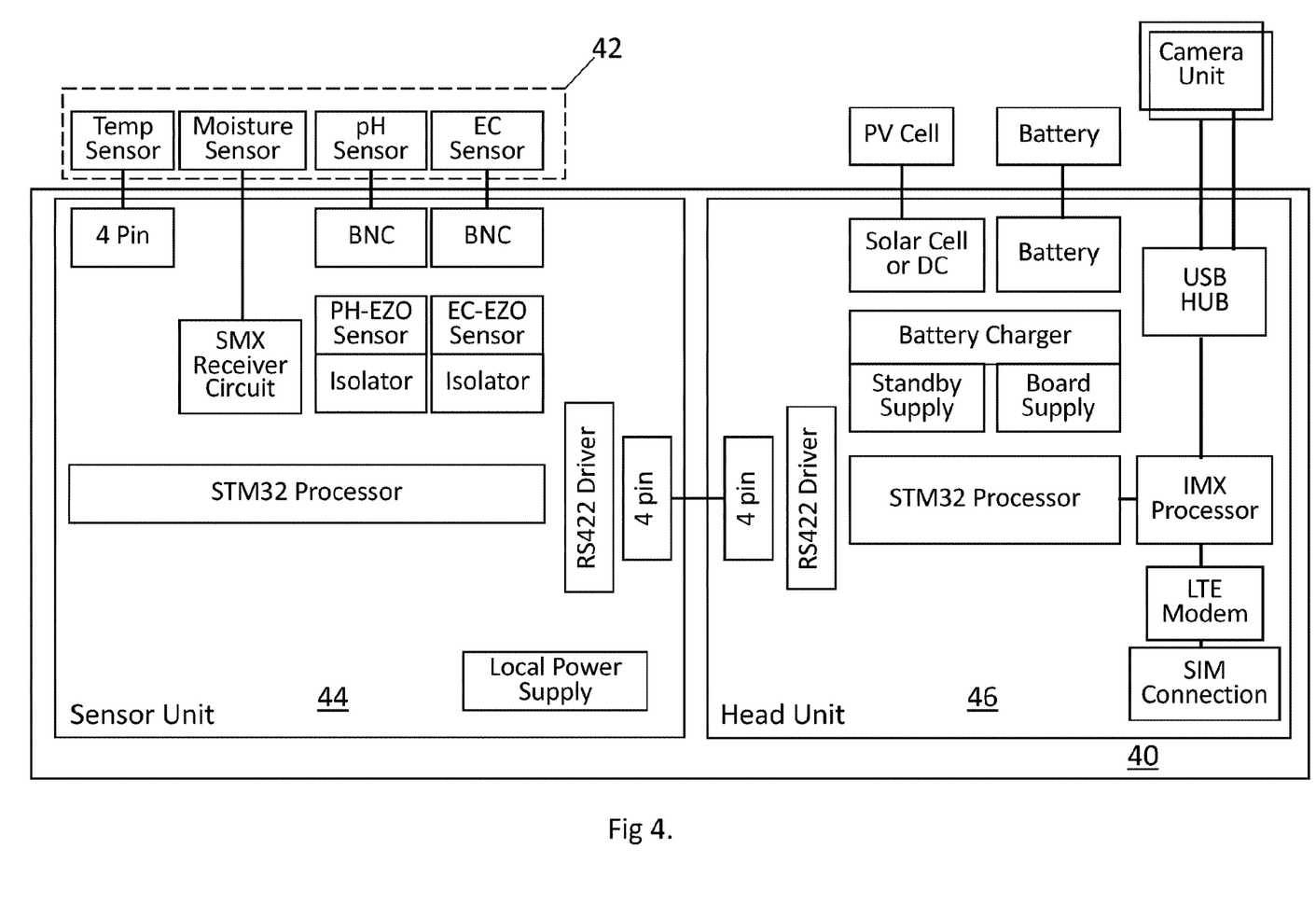
FIG. 4 is a block diagram of the hub from FIG. 2 representing the interconnection of electronic devices that may be provided with the support of FIG. 3.

The hub functions to collect images from the camera and sensing data (soil measurements). As shown in FIG. 4, the hub 40 connects to the soil sensor unit 42 which comprises one or more soil sensors as described previously. The soil sensors connect through electrical connectors to a sensor unit 44 of the hub. Signal conditioning or other interface circuitry is provided to present the measurements from the sensors in a form where they may be input to a processor. In the arrangement shown, this processor is separate from the main processor of the hub which is shown as being within a head unit 46. The sensor unit may be located with or separate to the head unit. In one arrangement, the sensor unit is located in a separate hermetically sealed unit which is positioned close to and may be accessed through the previously described second door and a connection is provided by means of a suitable cable to the head unit. This connection may provide power and a data connection to the head unit. The data connection may be by means of a RS422/RS485 interface with suitable interface circuitry provided in each of the sensor and head units.

The hub may be configured in a low power mode between sensor measurements and image acquisition from the camera so as to prolong battery life and to minimise the size of battery and solar panel required. Thus, the hub may be configured to operate in a sleep mode. A timer or other feature may be provided to periodically cause the hub to awake periodically at intervals so as to obtain measurements from the soil sensors.

Depending on the resolution required, the interval duration may be set to be at least 5 minutes. It will be appreciated that images are far more data intensive than general sensor measurements which tend to be a single scalar value. At the same time, the power consumption of a camera is generally more than that of discrete sensors. To account for this the hub may be configured to power the camera at a second interval. The second interval may be at least five times longer than the first interval. Thus, whilst measurements from the soil sensors might be automatically obtained every six minutes, an image from the camera might only be obtained every half hour. In this way it will be appreciated that the measurement are contemporaneous but do not necessarily have to be exactly coincident in time. Given the intent to provide a set of measurement indicative of both above and below ground parameters for a particular crop at a particular location, it will be appreciated that the resolution of the measurements in time may vary. However, as each of the two data elements are measuring the exact same position, irrespective of the fact that they are not necessarily measured at the same time, the system is configured to correlate the data elements to provide an output that reflects the above and below ground conditions in a consistent manner. In practise, a single image per hour may be a reasonable lower limit and once per day may be sufficient.

Suitably, the hub has a radio transmitting device to allow the hub to establish a data connection with a server to communicate the collected images and soil measurements. The data connection may also be employed to update the firmware or perform some other function on the hub.

The radio transmitting device may be one which is directly connected to an external data network, e.g. a mobile telephone network or it may connect to a relaying device which in turn connects the radio transmitting device to an external data network. It will be appreciated that a variety of different data communications methods may be employed and that it is not restricted to the use of a mobile phone telecommunications network.

As with other devices connected to the hub, the radio transmitting device may be disabled or placed into a low power state when not transmitting data.

The soil sensors may include one or more of the following:

a PH sensor, a soil temperature sensor, a soil conductivity sensor a soil moisture tension sensor and a chemical sensor. Examples of chemical sensors include for example but are not limited to sensors configured to measure the quantity of nitrogen, phosphorous, magnesium, sulphur and potassium.

Where the soil sensor is a pH sensor, the pH sensor may be a resistance pH sensor. For example, the pH sensor may be a pH probe from AtlasScientific™ of Long Island City, New York.

Where the soil sensor is a soil temperature sensor, the soil temperature sensor may be a hermetically sealed RTD sensor from Omega™ of Stamford, Connecticut. Similarly, the soil conductivity sensor may be an electrical conductivity probe from Atlas Scientific. Similarly, the soil moisture tension sensor may be a soil moisture tension sensor from Irrometer™ of Riverside, California.

The sensors may be arranged together in a frame so as to separate them from each other by a small distance. Wires may be connected through the frame to each of the sensors and back underground to the port on the pillar and through the pillar to the hub. In this context, the wires may be powered from the hub. Similarly, a wired connection may be provided to obtain measurements from the sensor. At the same time, the hub may wirelessly connect to the sensors. The soil sensors are suitably buried within the area being captured by the camera at specific known points above and below the ground. Accordingly, as part of the set-up the sensors are buried within the area of ground which is within the field of view of a camera on the pillar.

Suitably, the sensors may be buried at a depth of between 50 mm and 600 mm in the soil and more suitably between 100 mm and 200 mm. The depth may vary depending on the nature of the soil, the crop being grown or the sensor. Whilst it is desirable that the sensors remain undisturbed in the ground for as long as possible, it is possible that they may need to be replaced or removed for calibration.

In this context, it is desirable that the sensors or the frame be readily locatable so as to avoid unnecessary disturbing of the ground and possible damage to the sensors or wires connecting them to the hub.

To facilitate this, one or more locating devices may be provided for locating the position of the sensors or the frame. In a first approach, a laser device (pointer) is provided on the pillar which is generally aligned with the imaging axis of the camera with the pointer being used to position the sensors or frame in the ground. Once buried, activating the laser pointer allows for the position of the buried sensor or frame to be located reliably. The laser pointer may be housed within the pillar. Alternatively, a receiver or guide may be provided on the pillar for receiving a laser device which may be removably placed in the receiver/guide when a sensor/frame is being buried and retrieved.

In another approach which may be combined with the first or used in the alternative, an RFID tag or similar device is co-positioned with the frame or sensor in the ground. A RFID detector may then be employed when trying to identify the position of the sensor/frame.

It will be appreciated that the primary function of the hub is to provide sensor data along with image data where a camera is provided with the hub to a server. In the case where the camera is not positioned permanently with the hub, the image data may be provided separately to the server.

Various measurements may be determined for the crop from the captured images. These measurements may include crop growth. In this context, one method of measuring the crop growth is using a neural network that has been trained on images with known volumes of the crop. Once trained, the neural network may then predict grass volume from captured images. This has been shown to be effective to a reasonable degree of accuracy. Crop Growth may then be determined by measuring the difference in measured volumes, for example between two successive days. At the same time, using changes to successive daily growth calculations allows a determination of growth rate over a period of time.

In both arrangements, the server receives the image and sensor data. This information is combined with activity data obtained by tracking activity on the associated land.

The tracking activity aspect will now be described and in particular in the context of tracking the activity of the farmer. The system tracks the farmers activity using a mobile tracking and communication device, which suitably may be a smart phone or similar device 8. The tracking may be performed automatically or activated as required by the user.

User-activated tracking is when the farmer selects from a menu or similar interface on the device, that are carrying out a specific activity event on the farm. The specific activity may for example be fertiliser application, watering, slurry spreading or other land treatment. The system uses the devices sensors to collect and store relevant information such as location and time to record the activity. Once the activity is complete the farmer selects on the device to stop the tracking for the activity event. The system combines the recorded information with other farm information to calculate farm performance metrics. An example is using the location tracking for fertiliser application with the farm mapping and growth rates to calculate fertiliser return on investment.

Figure 6:
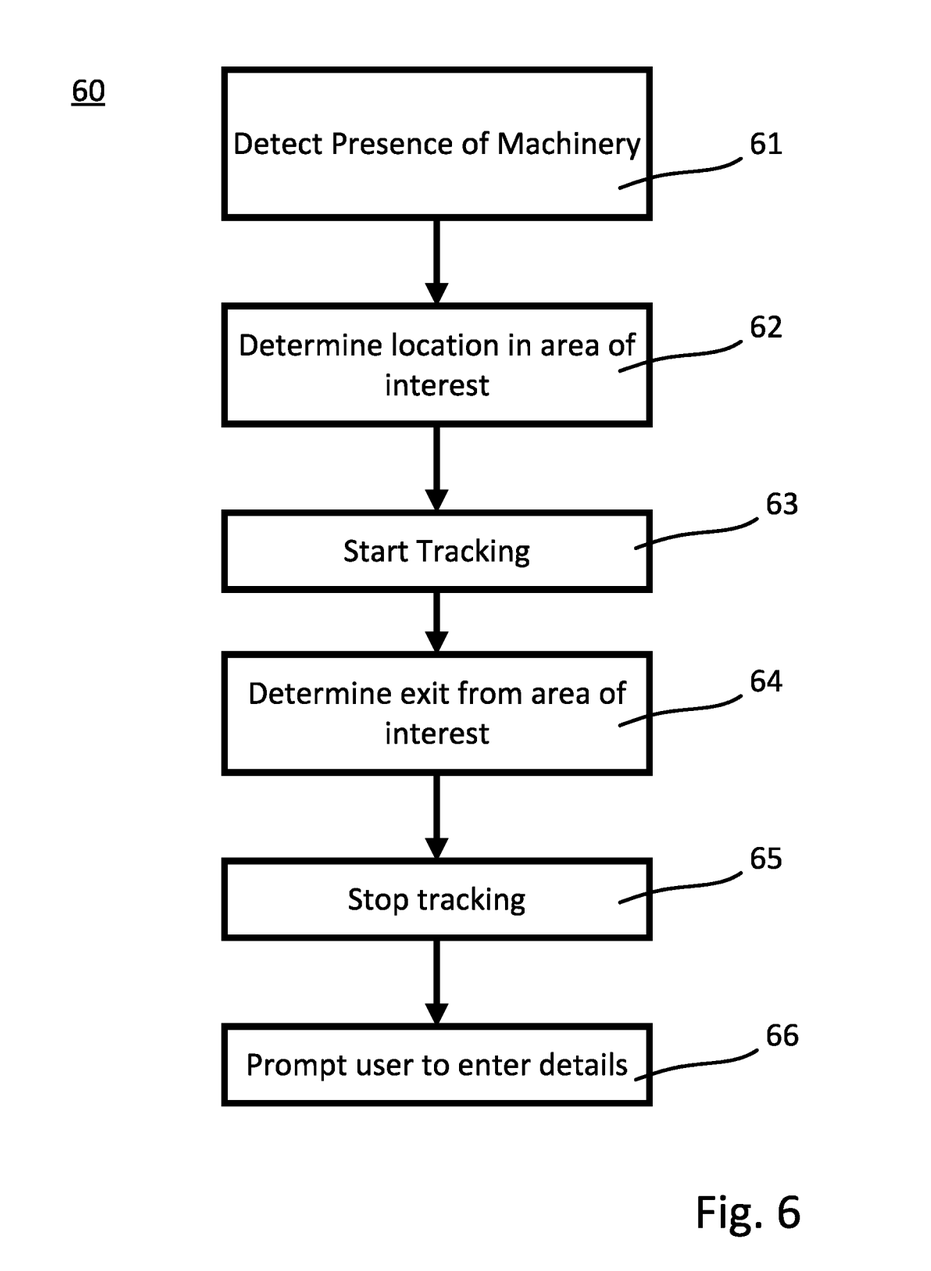
FIG. 6 is a flowchart of an exemplary tracking method for use in the user device of FIG. 1.

Automatic tracking is when the system, using the farmers device, continuously monitors the farmers activity such as their location. An exemplary method 60 employed by the farmers device is shown in FIG. 6, which commences with an optional step of identification 61 of the presence of a piece of machinery in proximity to the farmer's device. The step of identification may be by the user manually selecting/entering the machinery from a menu on their device. Alternatively, the detection may be performed automatically by the farmers device detecting the proximity of a wireless identifier associated with a piece of machinery. The wireless identifier may be a wireless device affixed to a piece of machinery, e.g. a WiFi™ or Bluetooth™ device. A corresponding wireless receiver on the farmers device can detect the proximity of such a wireless identifier using techniques as would be familiar to those skilled in the art.

In this context, the machinery may be considered as farm vehicles, e.g. tractors or quad bikes. Machinery may also be considered as attachments for such vehicles, such attachments may include sprayers, spreaders and other machinery which may be used to treat land.

As an example of how the method then operates is that the system having recognised that the farmer is close to a piece of machinery (e.g. their tractor e.g. by detecting the presence of a wireless tag for the tractor), the farmers device determines its position using a suitable positioning system, which may be a satellite based positioning system such as for example GPS. A determined position may then be compared with previously stored mapping information to determine 62 when the machinery enters an area of land of interest. Once this occurs, the position of the device within the land of interest may be recorded 63 to record a track representing an activity on the land of interest. When a position of the device is detected 64 outside of the area of land of interest, the tracked activity may be halted 65. At this point, the farmer's device may prompt 66 the user through an interface on their device to enter further information on the tracked activity. As an example, if the device is unaware as to the specific machinery that was employed or the function that was being performed, then the user may be prompted to enter this information. As an example, a tractor may be used for several different activities, e.g. ploughing, cutting, spreading slurry or fertilizer.

The tracking information once obtained may be uploaded periodically to the server where it may be associated with the farmer and their land. The information is not necessarily restricted to one farmer but rather is associated with areas of land and may be associated with several users.

One thing that the system may be employed for is to ensure that farmers comply with environmental targets set for them in rules or guidelines. The system may help the farmer to gather and control the data that they provide to authorities to confirm their compliance with rules.

As an example, the following are some of the reasons how the tracking may help a farmer's nutrient management planning:

1. Patterns and amounts of manure application on identifiable parcels of land. In terms of biological/organic application, the number of animals, type and amount of manure per animal.

2. The amount of fertilizer and its percentage in terms of purity and nitrogen, phosphorus, and potassium, NPK, content.

3. Farm and nutrient management by the use of accurate mapping of land parcels, the farmer can also record the importation/exportation of manure to other farms, taking into account the season, vegetation type, type of soil, livestock grazing and suitability for fertiliser/manure application.

Combined, or by themselves, an understanding of the effect of these on production levels can help crop target yields and allow for the provision of advice on the needs of the soil for various nutrients to comply with environmental compliance requirements, including for example nitrate zones and buffer strips.

It will be appreciated that the processing power available in a low power environment which is described above in the context of the hub and support is relatively small and the data capacity storage limited.

Accordingly, the processing of the images, sensor data and other information including for example the tracking information from the app obtained is performed by a server, which may for example be implemented in a cloud environment. In this way, all data related to the carrying out of agricultural practices may be input to the app on a mobile device. This data may for example include, farm details, nutrient products (fertiliser, slurry, manure, specialist applications), crop planting, crop grazing, crop cutting, tillage methods, irrigation and all other data related to agricultural practices.

All of this data may be analysed using artificial intelligence, neural networks or fuzzy logic systems so that previously recorded data can be employed to generate a model which can predict future outcomes thus allowing targeted advice to be provided to a farmer.

The server may also accept weather data for feeding into models employed by the system. This weather data may be by means of one or more weather sensors provided on the support. Alternatively, the weather data may be received from a weather station positioned elsewhere on the farm or in the locality. Further alternatively, it may be obtained from a source of weather information available on the Internet. The advantage of the latter is that it can include forecast information as well as current weather information which may be used to inform a farmer with respect to particular actions.

One aspect that is provided by the system is growth measurement for a crop. Existing growth measurements include the use of plate meters and physical cutting of a measured area of a crop. In the latter case, an area of crop is marked out and cut, for example a one square meter area is marked out and cut and a weight of the crop cut determined. A second measurement may be taken an interval later, for example a day or a week from a different one square meter area which is close to the first. The increase in weight divided by the interval gives a growth rate or yield for the crop.

It will be appreciated that this approach like that of a plate meter is both cumbersome and time consuming.

The present system uses image analysis to provide a measurement of crop growth or yield or both. More particularly, the present system trains a neural network to determine a growth rate or yield or both. Once trained the neural network may be configured to obtain measures from images captured for a crop. A growth rate or yield or both may then be determined from the differences between measures determined for images acquired an interval apart.

The method of training the neural network is to provide the neural network with a training set of data comprising images captured of crop. The neural network is configured to classify the images based on the volume of crop in the image, i.e. using the known correlated measurements obtained for example using a ground plate.

Although, the network can be trained with a variety of inputs and variables. In practise it has been found that it is useful to limit the number of variables as much as possible. Thus, by identifying the crop or limiting individual neural networks to individual types of crop (e.g. grass), a significant variability is removed. Similarly, this is the reason, why the images captured by the cameras are desirably at a fixed consistent angle. Similarly, it is desirable that the height of the camera be consistent. Although, it has been determined that the height is less important than the angle.

Similarly, other information may be fed into the neural network that may improve the performance of the neural network further.

The training data is generally the acquired images of crop. These acquired images are correlated with actual measurements of crop volume (which may be a weight and not strictly a volume as such) taken for the same crop using a plate meter or other method representing the crop in the area where the images were acquired. Thus, the neural network is of the type generally known as a classifier, with the neural network classifying an image into a class of crop volume, i.e. the ability to classify an image of crop into a classification of crop volume and thus a measurement of crop volume is inferred.

In the neural network trained, the training data acquired was from multiple crop locations. Once trained, the system may process the data captured by the image sensors and return a yield (volume) output. The yield may be presented as a value per unit area (e.g. square meter) or it may be configured to present an overall figure for a parcel of land with a crop (e.g. a field).

It will be appreciated by obtaining two images for the same crop an interval apart, a first crop volume may be obtained for the first image and a second crop volume may be obtained for the second image. From these two volumes, a crop growth value may be determined in respect of the two images.

Thus, if this growth was to be expressed in a percentage growth value per day, then this value might be determined as:

$$\text{Growth value} = 100 * \frac{CV2 - CV1}{CV1} / \text{Interval},$$

where CV1 is the crop volume determined for the first image and CV2 is the crop volume determined for the first image and Interval is the time difference in days between the time of capture of the first image and the time of capture of the second image. The server may be configured to present this to a user on the user interface on their device.

It will be appreciated that as the volume of data and different measurements from the sensors and other data captured from other sources by the server is expanded that the system opens up further significant opportunity. More specifically, different neural networks may be trained using combinations of data acquired from tracking activity, soil sensors, climatic conditions and crop yields (obtained from the previously described neural network) and image data acquired to provide future advice to farmers based on data accumulated over a long period of time from multiple farms. It will be appreciated that additional information may be fed into the neural networks using information obtained from other datasets. As an example, open source datasets are available in Ireland which map land into different types of soil and percolation values in part representing the underlying geology. These values may be fed into the neural network.

It will be appreciated that what has been described herein are exemplary arrangements of an autonomous system for managing crops, the system being configured to record and utilise data indicative of both above and below ground conditions which are contemporaneously measured at the same location to provide an output that incorporates data derived from soil conditions and growth of the crop. The system combines data reflective of each of above and below ground parameters as measured concurrently from in-soil sensors, imaging devices and optionally activity trackers, and analyses the data to provide data outputs based on accurate and consistent soil and crop management measurement parameters. The system is effectively autonomous in that once deployed at, at or adjacent to, a crop that is being monitored, the support of the unit remains in that physical location inserted in the ground gathering and processing data using the processing hub. The capacity of the processing hub to effect communications with remote parties whilst having its own power supply provides the user—in most cases the farmer—with information from their fields about the crop condition and triggers actions by the users based on real-time monitoring of above and below conditions of the crop and the soil it is growing in.

Although the present application has been described with references to certain exemplary implementations, the application is not to be considered limited to these examples and that multiple variations are possible. As an example, it will be appreciated that a single structure could be positioned at the boundary between two fields. In this scenario, a single hub might be provided with each field having a respective camera and sensor(s) directed to it, with both respective cameras and sensor(s) connecting to the same hub.

The words comprises/comprising when used in this specification are to specify the presence of stated features, integers, steps or components but does not preclude the presence or addition of one or more other features, integers, steps, components or groups thereof.

The invention claimed is:

1. A sensor system for monitoring ground in a defined area with a crop, the sensor system comprising:
a hub;
an-elongated support configured for mounting in the ground having an above ground portion and a below ground portion arranged, along a longitudinal axis, which are-configured to respectively be positioned above and below a ground level when mounted in the ground, and the elongated support has a port provided in the below ground portion;
at least one ground sensor, having a connection to the hub through the port and elongated support, for measuring a parameter of the ground beneath the ground level in the defined area with the crop and providing the measurement to the hub; and
a first imaging device housed in the elongated support and positioned at a distance along the longitudinal axis of between 0.5 m and 1.2 m from the ground level on the support, the first imaging device comprising a first lens and a first image sensor in communication with the hub, the first image sensor being aligned transverse to an imaging axis wherein the imaging axis of the first imaging device is at an angle of between 50 and 80 degrees to the longitudinal axis, the first imaging device being configured to capture an image of the defined area with the crop and to provide the captured image to the hub.

2. A sensor system according to claim 1, wherein the first imaging device is positioned at a height of between 0.9 m and 1.2 m above ground level, wherein the imaging axis of the first imaging device is at an angle of between 60 and 70 degrees to the longitudinal axis.

3. A sensor system according to claim 1, wherein the hub is provided within a protective enclosure within the elongated support.

4. A sensor system according to claim 1, further comprising a power source for storing power for powering the hub, wherein the power source is housed with the elongated support, wherein the power source is a rechargeable power source and further comprising a solar panel for recharging the rechargeable power source.

5. A sensor system according to claim 1, wherein the first lens has a focal length which defines a field of view for the first image sensor, which restricts an image of a crop area to between 1.5 m×1.5 m to 5 m×5 m to be captured.

6. A sensor system according to claim 1, wherein the first image sensor is an infra-red image sensor.

7. A sensor system according to claim 1, wherein the first image sensor has a resolution of at least 1 mega pixel.

8. A sensor system according to claim 1, further comprising a radio transmitting device in communication with the hub for transmitting data from the hub, the data comprising images acquired from the first imaging device and measurements obtained from the at least one ground sensor, wherein the radio transmitting device is configured to establish a data connection with a mobile telephone network or other radio telecommunications network.

9. A sensor system according to claim 1, further comprising a second imaging device housed in the support, the second imaging device comprising a second lens and a second image sensor in communication with the hub, the second image sensor being aligned transverse to a second imaging axis.

10. A sensor system according to claim 9, wherein the second imaging device is configured to be a height of at least 0.5 m above expected maximum crop height, wherein the expected maximum crop height is at least 1.2 m.

11. A sensor system according to claim 1, wherein at the at least one ground sensor comprises at least one of:
a) a pH sensor for measuring the pH of soil;
b) a resistance pH sensor for measuring the pH of soil;
c) a soil temperature sensor;
d) a soil conductivity sensor; and
e) a soil moisture tension sensor.

12. A sensor system according to claim 1 further comprising a locating device for locating the position of the at least one ground sensor wherein the at least one ground sensor comprises an RFID and the locating device is a RFID detector.

13. A sensor system according to claim 12, further comprising a locating device for locating the position of the at least one ground sensor wherein the locating device comprises a laser device aligned on the support so that the beam from the laser device points to the position of the at least one ground sensor.

14. A sensor system according to claim 1, wherein the sensor system is configured to determine a measurement of crop volume from a first image obtained from the first imaging device and to determine a measurement of crop volume for a second image obtained from the first imaging device and to compare the first and second measurements to determine a growth figure for a crop within the first and second images and to provide this measurement to a user through a user interface.

15. A sensor system according to claim 14, wherein the sensor system further comprises a server having a data connection with the hub for the transmission of the first and second images to the server and wherein the server is configured to determine the growth figure.

16. A method of use of a sensor system according to claim 1, the method comprising the steps of:
positioning the hub and the first imaging device adjacent to but outside the crop area to be monitored and aligning the first imaging device so that it can capture an image of the crop area and burying the at least one ground sensor within the crop area and connecting the at least one ground sensor to the hub.

17. A sensor system for monitoring ground in a defined area with a crop, the sensor system comprising:
a hub;
an elongated support configured for mounting in the ground having an above ground portion and a below ground portion arranged, along a longitudinal axis, which are intended to respectively be positioned above and below a ground level and the elongated support has a port provided in the below ground portion;
at least one ground sensor positioned in the defined area, having a connection to the hub through the port and elongated support, for measuring a parameter of the ground in the defined area with the crop area and providing the measurement to the hub and
a first imaging device housed in the support and positioned at a distance along the longitudinal axis of between 0.5 m and 1.2 m from the ground level on the support, the first imaging device comprising a first lens and a first image sensor in communication with the hub, the first image sensor being aligned transverse to an imaging axis wherein the imaging axis of the first imaging device is at an angle of between 50 and 80 degrees to the longitudinal axis, the first imaging device being configured to capture a first image of the defined area with the crop at a first time and to provide the captured first to the hub and to capture a second image of the defined area with the crop at a second time, the second time being an interval apart from the first time, and to provide the second captured image to the hub,
the sensor system further comprising a neural network, the neural network being configured to accept the first and second captured images and to provide to a user a growth figure for growth of the crop during the interval between the first and second times, wherein the neural network has been trained using a plurality of images associated with known values of crop volume.

* * * * *